United States Patent
Andreyev et al.

(10) Patent No.: US 10,036,817 B2
(45) Date of Patent: Jul. 31, 2018

(54) SOLVING OUTSIDE-FIELD OF VIEW SCATTER CORRECTION PROBLEM IN POSITRON EMISSION TOMOGRAPHY VIA DIGITAL EXPERIMENTATION

(71) Applicant: KONINKLIJKE PHILIPS N.V., Eindhoven (NL)

(72) Inventors: Andriy Andreyev, Willoughby Hills, OH (US); Yang-Ming Zhu, Solon, OH (US); Jinghan Ye, Livermore, CA (US); Xiyun Song, Cupertino, CA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/569,209

(22) PCT Filed: Apr. 25, 2016

(86) PCT No.: PCT/IB2016/052332
§ 371 (c)(1),
(2) Date: Oct. 25, 2017

(87) PCT Pub. No.: WO2016/178116
PCT Pub. Date: Nov. 10, 2016

(65) Prior Publication Data
US 2018/0120459 A1 May 3, 2018

Related U.S. Application Data

(60) Provisional application No. 62/220,492, filed on Sep. 18, 2015, provisional application No. 62/156,480, filed on May 4, 2015.

(51) Int. Cl.
*G01T 1/29* (2006.01)

(52) U.S. Cl.
CPC .......... *G01T 1/2985* (2013.01); *G01T 1/2992* (2013.01)

(58) Field of Classification Search
CPC .......................... G01T 1/2985; G01T 1/2992
See application file for complete search history.

(56) References Cited

U.S. PATENT DOCUMENTS

| 8,017,914 B2* | 9/2011 | Wollenweber | G01T 1/1648 250/363.01 |
| 2004/0260176 A1 | 12/2004 | Wollenweber | |

(Continued)

FOREIGN PATENT DOCUMENTS

| WO | 2009/004523 | 1/2009 |
| WO | 2010/095062 | 8/2010 |

OTHER PUBLICATIONS

Jinghan Ye, et al., "Scatter correction with combined single-scatter simulation and Monte Carlo simulation for 3D PET" 2014 IEEE Nuclear Science Symposium and Medical Imaging Conference.

(Continued)

*Primary Examiner* — Marcus Taningco

(57) ABSTRACT

Method and apparatus are disclosed for generating a scatter-corrected image from positron emission tomography (PET) or other radioemission imaging data (20) acquired of an object (12) in a field of view (14). A background portion (26B) of the PET imaging data is identified corresponding to a background region (14B) of the FOV that is outside of the object. An outside-FOV activity estimate (40) for at least one spatial region outside of the FOV and into which the object extends is adjusted (e.g. iterative or several randomly selected estimates) to optimize a simulated scatter distribution for the combination of the PET imaging data and the outside FOV activity estimate to match the background portion (26B) of the PET imaging data. The PET imaging (Continued)

data are reconstructed to generate a scatter-corrected PET image of the object in the FOV using the optimized simulated scatter distribution.

25 Claims, 6 Drawing Sheets

(56)    References Cited

U.S. PATENT DOCUMENTS

2008/0240335 A1* 10/2008 Manjeshwar .......... A61B 6/032
                                                            378/4
2013/0026370 A1*  1/2013 Qian .................... G01T 1/1615
                                                          250/362

OTHER PUBLICATIONS

Wollenweber, et al., "Parameterization of Model-Based 3-D PET Scatter Correction" IEEE Transactions on Nuclear Science, vol. 3, No. 49, Jun. 1, 2002.
Atwood,e t al., "Monte Carlo and Detector Simulation in OOP*", Oct. 18, 1990.

* cited by examiner

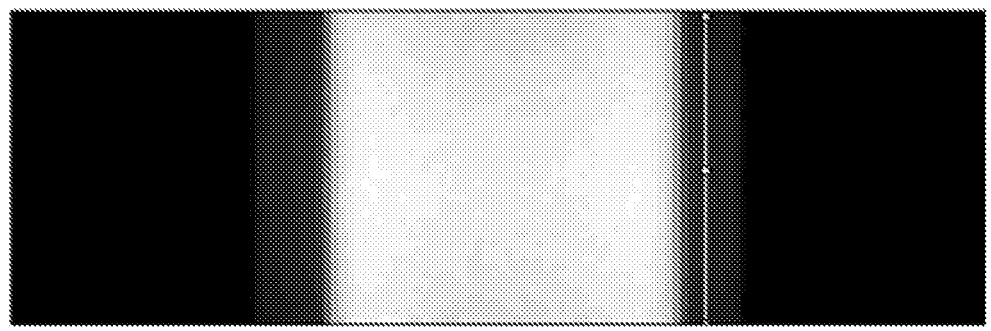

B L
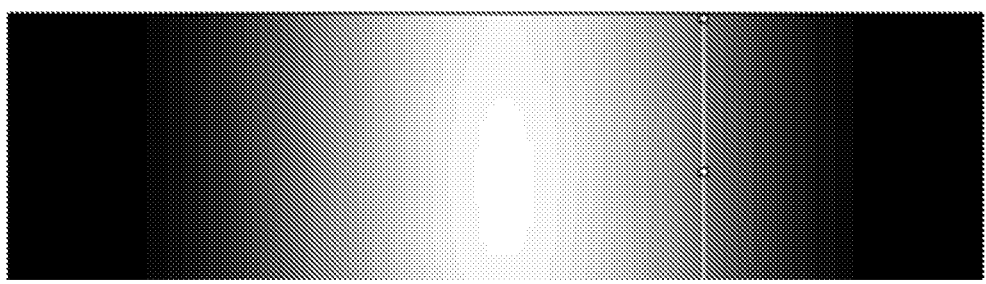

B L
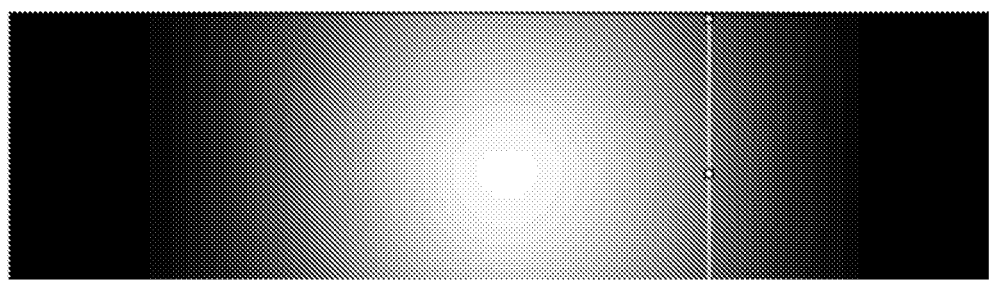

B L

SOLVING OUTSIDE-FIELD OF VIEW SCATTER CORRECTION PROBLEM IN POSITRON EMISSION TOMOGRAPHY VIA DIGITAL EXPERIMENTATION

CROSS REFERENCE TO RELATED APPLICATIONS

This application is the U.S. National Phase application under 35 U.S.C. § 371 of International Application No. PCT/IB2016/052332 filed Apr. 25, 2016, published as WO 2016/178116 on Nov. 10, 2016, which claims the benefit of U.S. Provisional Patent Application No. 62/156,480 filed May 4, 2015 and U.S. Provisional Patent Application No. 62/220,492 filed Sep. 18, 2015. These applications are hereby incorporated by reference herein.

FIELD

The following relates generally to the radioemission imaging arts, positron emission tomography (PET) imaging arts, radiological image reconstruction arts, and related arts.

BACKGROUND

Inaccurately accounted scatter from the radioemission activity that is outside of the field of view (FOV) is one of the major sources of errors in quantitative PET imaging. If the outside-FOV activity was not accounted for properly, deviations on the order of 10% of the reconstructed emission activity can be introduced into the reconstructed image.

One way to account for outside-FOV activity is to perform an additional PET/CT scan of adjacent regions. In clinical practice this may be undesirable due to time limitations and other factors such as possibly increased radiation dose to the patient, e.g. if a computed tomography (CT) scan is employed in the extension to adjacent regions.

In clinical practice, the problem of outside-FOV activity is sometimes ignored, or is addressed by making some assumptions about the outside-FOV activity. In one such latter approach, if there is an activity in the first and last visible slices, then extension (duplication) of those slices can be performed to extend the volume by a certain empirically established distance. The correction for the scatter contamination can then be derived from such assumptions. The accuracy of the approach depends upon the extent to which the assumption(s) are justified. In another approach, the maximum extrapolation of the outside-FOV activity is limited by the length of the object as well as the scanned axial extent distance. This approach works well for uniform cylinder phantoms of various lengths when the cylinder phantom is positioned centered with respect to the center of the axial FOV, but may be less accurate in most other (clinical) cases.

The following discloses a new and improved systems and methods that address the above referenced issues, and others.

SUMMARY

In one disclosed aspect, a radioemission imaging system comprises a radioemission imaging data acquisition system configured to acquire radioemission imaging data in a field of view (FOV), and an electronic data processing device programmed to reconstruct and correct the radioemission imaging data by operations including: identifying a background portion of the radioemission imaging data corresponding to a background region of the FOV that is outside of an object disposed in the FOV; adjusting an outside FOV activity (and optionally attenuation) estimate for at least one spatial region outside of the FOV to optimize a simulated scatter distribution for the combination of the radioemission imaging data and the outside FOV activity and attenuation estimate; and reconstructing a scatter-corrected image of the object in the FOV using the optimized simulated scatter distribution.

In another disclosed aspect, a method is disclosed of generating a scatter-corrected image from positron emission tomography (PET) imaging data acquired of an object in a field of view (FOV). The method comprises: identifying a background portion of the PET imaging data corresponding to a background region of the FOV that is outside of the object; adjusting an outside FOV activity (and optionally attenuation) estimate for at least one spatial region outside of the FOV and into which the object extends to optimize a simulated scatter distribution for the combination of the PET imaging data and the outside FOV activity and attenuation estimate to match the background portion of the PET imaging data; and reconstructing the PET imaging data to generate a scatter-corrected PET image of the object in the FOV using the optimized simulated scatter distribution.

In another disclosed aspect, a non-transitory storage medium is disclosed which stores instructions that are readable and executable by an electronic data processing device to perform a method for estimating a scatter distribution in positron emission tomography (PET) imaging data acquired of an object in a field of view (FOV). The method comprises: identifying a background portion of the PET imaging data comprising lines of response (LORs) that do not pass through the object; adjusting an outside FOV activity (and optionally attenuation) estimate for at least one spatial region outside of the FOV and into which the object extends to optimize a simulated scatter distribution for the combination of the PET imaging data and the outside FOV activity and attenuation estimate respective to the background portion of the PET imaging data; and estimating the scatter distribution in the PET imaging data as the optimized simulated scatter distribution output by the adjusting.

One advantage resides in providing more accurate scatter correction of radioemission imaging data such as PET imaging data.

Another advantage resides in providing more accurate estimation of outside-FOV scatter in radioemission imaging data such as PET imaging data of a radioemissive object that extends outside of the FOV of the radioemission imaging data.

Another advantage resides in providing more efficient imaging workflow by providing accurate outside-FOV scatter estimation without requiring collection of data for the portion of the object lying outside of the FOV.

A given embodiment may provide none, one, two, more, or all of the foregoing advantages, and/or may provide other advantages as will become apparent to one of ordinary skill in the art upon reading and understanding the present disclosure.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

DETAILED DESCRIPTION

It is recognized herein that outside-FOV scatter correction approaches such as duplicating the last known slices to extend the FOV have certain disadvantages and limitations. These approaches assume that the activity outside the FOV is constant and limited. An axial profile that includes a hot spot at an axial edge of the FOV will result in slice duplication introducing too much activity outside of the FOV, leading to scatter overcorrection. By contrast, if the activity is low (or zero) at the axial edge of the FOV and then increases just outside of the FOV, the slice duplication will under-correct for the outside-FOV scatter. Approaches disclosed herein provide outside-FOV scatter correction by estimating the outside FOV activity distribution without actually performing an imaging scan of the adjacent regions. The disclosed approaches are readily implemented as part of the scatter correction simulation in positron emission tomography (PET) image reconstruction.

In one approach, the problem of unaccounted outside-FOV scatter is solved by the following operations: (1) The PET imaging system acquires 511 keV coincidence data and generates a random-corrected prompt event sinogram which contains only true and scattered events (due to the random events correction); (2) A simulations operation in which several scatter distribution sinograms are generated assuming different outside-FOV activity distributions; (3) The object boundary in the prompts sinogram space is detected, and the detected boundary is used to find the scatter components in the random-corrected sinogram from the first operation and in the multiple simulated scatter sinograms from the second operation; (4) One intensity distribution profile is chosen from the multiple simulated scatter sinograms that best matches the intensity distribution profile of the random-corrected sinogram background ("True scatter"); and (5) The chosen simulated scatter sinogram is used to correct for scatter in the final image.

Figure 1:
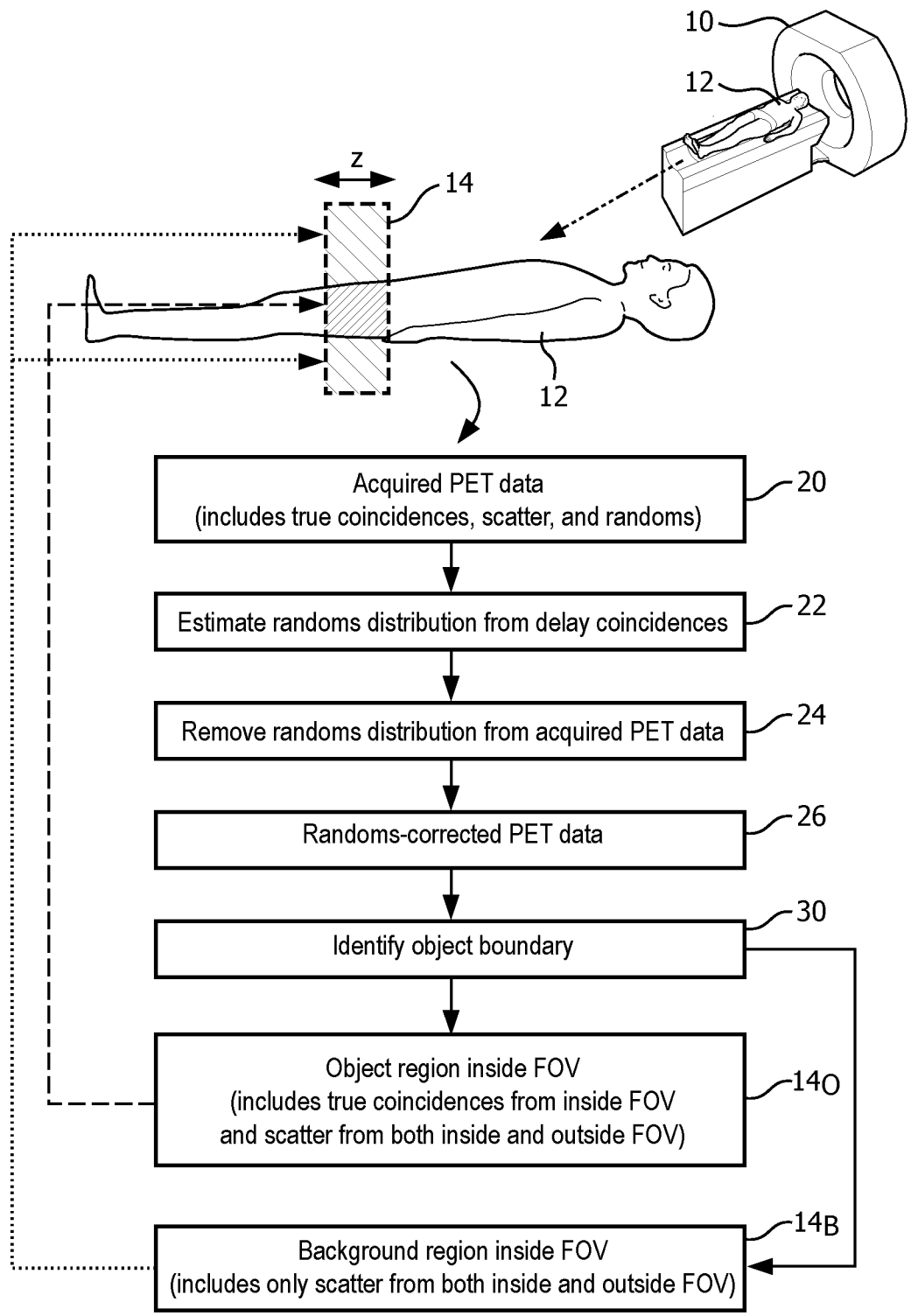
FIGS. 1 and 2 diagrammatically illustrate a positron emission tomography (PET) imaging system including outside-FOV scatter correction as disclosed herein.
Figure 2:
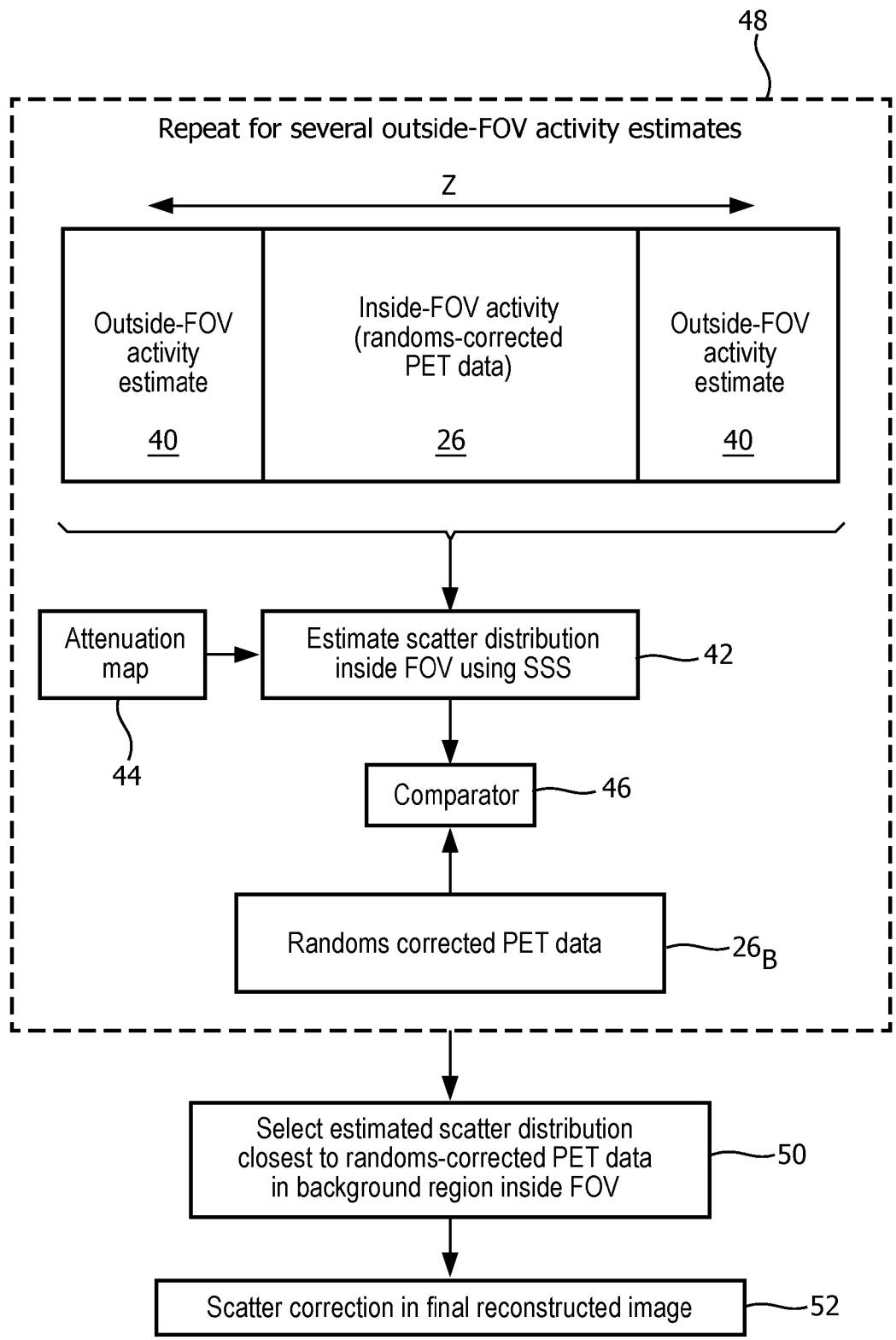

With reference to FIGS. 1 and 2, some illustrative embodiments are described. The system includes a positron emission tomography (PET) imaging system or scanner 10 which performs PET imaging of a subject 12 in a field of view (FOV) 14. The PET imaging system 10 may provide time-of-flight (TF) capability, or may be a conventional PET scanner without TF capability. The PET imaging system 10 may optionally be part of a hybrid imaging system, for example also providing computed tomography (CT) imaging capability (i.e. a PET/CT system). By way of non-limiting illustration, the PET imaging system 10 may, for example, be an Ingenuity™ TF PET/CT system or a Vereos Digital PET/CT system, both available from Koninklijke Philips N.V., Eindhoven, the Netherlands. In a typical configuration for imaging of human subjects, the PET imaging system includes a bed, couch or other patient support on which the subject lies in a supine or prone position, so that moving the couch into or out of the examination region of the PET scanner 10 moves the subject along the anterior-posterior direction, commonly referred to as the axial direction (denoted by the letter "z" in the drawings). One or more PET detector rings of the PET scanner 10 are oriented transverse to the axial (z) direction and surround the subject in the examination region to detect 511 keV gamma rays emitted by positron-electron annihilation events. A line-of-response (LOR) is defined by the detection of two temporally coincident (within some defined time window) 511 keV gamma rays (within some defined energy window). As an electron-positron annihilation event emits two oppositely directed 511 keV gamma rays, such an annihilation event defines a LOR if both 511 keV gamma rays are detected by the PET detectors. However, other types of events can result in "erroneous" LOR detections, including the following examples. In a scattering event, e.g. due to Compton scattering in the subject 12, the LOR defined between the two 511 keV gamma rays (one or both of which were re-directed by scattering) does not coincide with the sourcing positron-electron annihilation event. In a random event, two gamma rays of two separate unrelated electron-positron annihilations or background radiation happen to be detected as simultaneous 511 keV events defining a LOR. The electronics of the PET system 10 detect and record all possible combinations of prompt (those that include true, scattered and random coincidences) LORs, to form unprocessed or "raw" acquired PET data 20. These data 20 may be recorded in various formats, such as list mode (where each individual particle detection event is recorded with relevant information (detector location, timestamp, energy) or as a sinogram (histogram) count (labeled by LOR angle and sinogram row, i.e. detector crystal row). It will be appreciated that a sinogram can be generated from the list mode data as needed; additionally, list mode data have advantages such as enabling computation of TF information in the case of TF-PET.

In an operation 22, the randoms rate is estimated (e.g. for each sinogram angle/row, or for each detector in the case of list mode data). This estimation of random events can be done by counting "delayed" coincidences, that is, 511 keV detection events separated by (within the coincidence time window) a chosen non-zero time interval that is large enough to exclude "true" coincidence events due to electron-positron annihilation events. In an operation 24, the random rates (or distributions) estimated in operation 22 are used to remove the effect of randoms from the as-acquired PET data 20, in order to generate randoms-corrected PET data 26. In one example implementation, a sinogram (histogram) representation of the obtained data is generated from the measured data 20. This sinogram has delayed events subtracted in operations 22, 24—correcting it for randoms, effectively leaving it being a sum of true and scatter coincidences (referred to as "Random Corrected Prompts" sinogram) 26. It will be appreciated that the operations 22, 24 does not remove scattering events since scattering (such as Compton scattering) generally does not materially alter the (nearly zero) time interval between the two 511 keV gamma rays simultaneously emitted by a positron-electron annihilation event.

The randoms correction 22, 24 is advantageous and preferably performed in order to remove the impact of randoms from the data and thereby produce more accurate image reconstruction. However, it is alternatively contemplated to perform the disclosed outside-FOV scatter correction techniques without performing randoms correction. For example, it will be appreciated that the disclosed outside-FOV scatter correction techniques can be employed in the context of other radioemission imaging techniques such as single photon emission computed tomography (SPECT) for which randoms correction is not readily performed (since there is no analog to the coincidence window in SPECT).

With continuing reference to FIG. 1, in the sinogram 26, the object (e.g., the human subject 12 in the illustrative example, in which a positron-emitting radiopharmaceutical has concentrated; as used herein, the term "object" denotes the physical structure comprising or imbued with positron-emitting radioactivity) has well-delineated boundaries. This is because any LOR (defined by an angle and row of the sinogram) that does not pass through the object will not count any "true" coincidence events and since randoms have been corrected, any LOR that does not pass through the object will only count scatter events. By contrast, any LOR that passes through the object will count both true coincidence events and scattered coincidences events. Since the rate of true coincidence events is expected to be much higher than the rate of scattered events, this produces a relatively steep and abrupt decrease in sinogram intensity at the boundary of the object. The sinogram signal outside the object includes only from scatter coincidences (again, randoms have been corrected for in operations 22, 24). These scatter coincidences include two components: scatter created from inside-FOV activity (inside the FOV 14), and scatter created from outside-FOV activity.

Recognizing the foregoing, in an operation 30 the boundary of the object is identified in the randoms-corrected PET data 26, for example by detecting the relatively steep and abrupt decrease in sinogram intensity at the boundary of the object. By detecting the object boundary, two distinct regions within the FOV 14 are identified: an object region $14_O$ inside the FOV 14 having both true coincidence events and scatter events (the latter originating from both inside and outside the FOV 14); and a background region $14_B$ inside the FOV 14 having only scatter events (again, the latter originating from both inside and outside the FOV 14).

While the object boundary delineation operation 30 is described as being performed directly on a sinogram representation of the randoms-corrected PET data 26 which is an efficient approach, other approaches are contemplated, such as performing an approximate reconstruction of the PET data 26 (e.g. using filtered backprojection) and delineating the object boundary in the approximately reconstructed image by applying any suitable delineating technique such as detecting the relatively steep and abrupt decrease in reconstructed image intensity at the boundary. A computed tomography (CT)-derived attenuation map is also an alternative convenient way to define the object boundaries, that can be easily transferred to PET coordinate space.

Techniques disclosed herein leverage this observation that the sinogram data (or other PET data representation) for the background region $14_B$ (located within the FOV 14 but outside of the object) includes only scatter counts, with no true coincidence counts. This means the total scatter is measured, although the fraction of scatter originating outside the FOV versus inside the FOV is not (yet) determined. Moreover, because the scatter distribution is usually slowly varying in space, the total scatter distribution in the background region $14_B$ can be extended (albeit with some reduction in accuracy) to estimate the total scatter in the object region $14_O$.

With continuing reference to FIG. 1 and further reference now to FIG. 2, an approach for identifying scatter originating from outside the FOV, supplementary to the scatter originating inside the FOV 14, is described. A typical scatter correction algorithm such as single scatter simulation (SSS) or Monte Carlo scatter simulation can be applied to generate the scatter sinogram based on the measured activity distribution from the object region $14_O$ (inside-FOV activity). In other words, if there were no radioactivity outside of the FOV 14, then applying SSS or another scatter correction algorithm to the measured inside-FOV activity would accurately generate the scatter distribution that is needed to compensate for the scatter impact from the data acquired inside the FOV. Similarly, applying SSS or other scatter correction algorithm to the full activity distribution, both inside and outside of the FOV, would generate the scatter sinogram for the scatter distribution that is also caused by outside-FOV activity. But, the outside-FOV activity is not known because the PET data 20 is acquired only in the FOV 14. However, it is recognized herein that the detailed (exact form of) outside-FOV activity does not need to be determined only its effect on the measured inside-FOV activity (i.e. the randoms-corrected PET data 26). To account for this, in the approach illustrated in FIG. 2 several scatter sinograms assuming various (e.g. randomly selected) outside-FOV activity distributions (and intensities, i.e. assumed activity distributions differing only by an intensity scaling factor are different distributions as used herein) 40 are generated. For each outside-FOV activity distribution estimate 40, combined with the known inside-FOV activity (i.e. the randoms-corrected PET data 26), an operation 42 estimates the scatter distribution for the combined activity 26, 40 using SSS, Monte Carlo scatter simulation, a more complex scatter simulation technique (e.g. accounting for both single and multiple scatter events). Typically, the scatter distribution estimation 42 also receives as input an attenuation map 44 or the distributed scattering effect of the subject 12. The attenuation map 42 may, for example, be generated based on a CT scan (which is convenient if the PET imaging system 10 is a hybrid CT/PET system), or estimated from the object boundary identified in operation 30 (see FIG. 1) along with known scattering properties of the object. Similarly, the respective attenuation map outside-FOV is not available, as typically PET and CT scans scanned regions are matching in most PET/CT studies. Therefore, certain generic volumes of attenuating medium will be placed alongside simulated outside-FOV emission intensity distributions. The scatter distribution estimated in operation 42 is compared (e.g. by a comparator 46) with the known scatter distribution in the background region $14_B$ which is given by randoms-corrected PET background data portion $26_B$ which is the portion of the randoms-corrected PET data 26 for the background region $14_B$ of the FOV 14. This process is repeated for several different credible outside-FOV activity and attenuation distribution estimates 40, as diagrammatically indicated in FIG. 2 by repetition block 48. For the sinogram-based PET data representation employed in the illustrative embodiment, the scatter sinogram output by the operation 42 (for the various repetitions 48) that most closely matches the measured "outside-object" scatter profile $26_B$ obtained from the random-corrected prompts sinogram 26 is selected in an operation 50 as the scatter distribution for use in a scatter correction operation 52 to produce the final scatter-corrected image inside the FOV 14.

The selection operation 50 is, in a suitable embodiment, performed by finding the most effective representation of the outside-FOV activity $x_{eff}$ by solving the following equation:

$$x_{eff} = \operatorname*{argmin}_{x} f(x)$$

where $f$ is a cost function to be minimized (implemented in illustrative FIG. 2 as the comparator 46) and x is a function that describes the outside-FOV activity and attenuation. Different forms of the cost function $f(x)$ can be used, such as minimum sum of absolute differences between the random corrected prompts sinogram background data portion $26_B$ and the simulated scatter sinogram candidate background portion output by the operation 42. In order to minimize the cost function, several forms of the estimates of outside-FOV activity and attenuation distribution x should be considered.

In general, the solutions may not be unique, and various different outside-FOV activity and attenuation distributions x can generate the same inside-FOV scatter impact as measured by the cost function $f(x)$; however, the exact form of the outside-FOV activity distribution x is not relevant the goal of the process of FIG. 2 is only to determine the appropriate or effective estimation of the outside-FOV activity impact to the inside-FOV activity.

Another alternative embodiment employs an iterative optimization algorithm, in which the scatter estimates are generated in sequences from one randomly chosen outside-FOV activity configuration 40, and compared to the measured sinograms $26_B$ in the object background $14_B$. The algorithm is expected to converge to one effective (possibly non-unique) outside-FOV scatter approximation. To improve computational speed, the hypothetical outside-FOV activity and attenuation distributions can be added as small volumes (slabs) one-by-one. The scatter contribution from each slab can also be scaled by the respective slab activity intensity range. Then during the iteration process, any new effective scatter sinogram is assembled from a selection of precomputed scatter kernels and their respective intensities.

The disclosed approaches leverage the background region $14_B$ for which only scattering events are measured. If the object fills the entire FOV, then such a background region would be unavailable. For example, in the case of medical radioemission imaging, a very large patient might occupy most of the transverse FOV. However, existing commercial PET scanners are available with large transverse FOV, e.g. a transverse FOV with a 60 cm diameter or larger in some commercial PET systems—accordingly, it is expected that this limiting situation of a very large subject is unlikely to occur frequently in practice.

In illustrative FIG. 2, the outside-FOV activity distribution estimate 40 includes a component on each (opposite) side of the FOV 14 (represented in FIG. 2 by the inside-FOV activity 26), and these two component are illustrated as being symmetric about the FOV. However, such symmetry is not required, e.g. the outside-FOV activity distribution estimates on the left and right sides can be different, which may be appropriate for example if the object is not centered in the FOV or if the activity distribution is expected to be asymmetric along the axial (z) direction.

Figure 3:
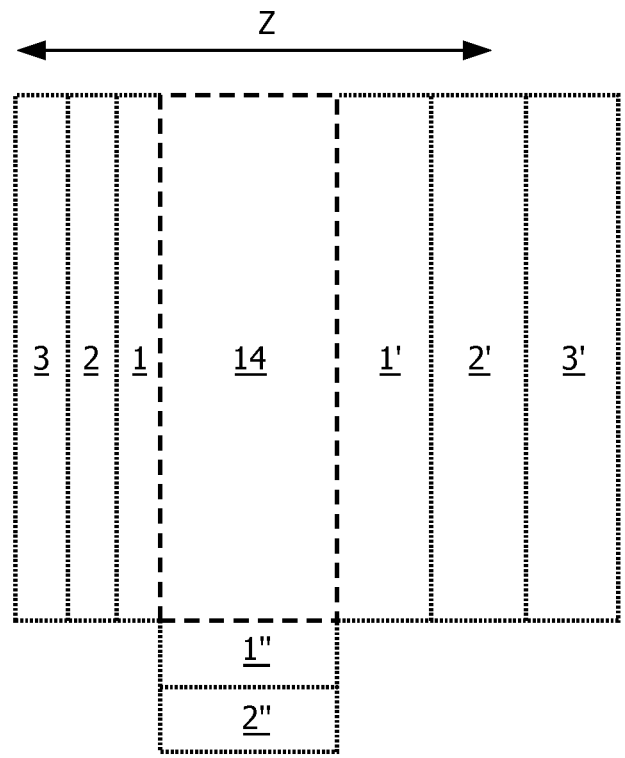
FIG. 3 diagrammatically illustrates various arrangements of outside-FOV activity distributions respective to a FOV.

With reference now to FIG. 3, such a case is diagrammatically illustrated. In this example, the first outside-FOV activity and attenuation distribution estimate includes components 1, 1' on the left and right, respectively, of the FOV 14. In the illustrative example of FIG. 3, the left outside-FOV activity component 1 is smaller in axial extent than the right outside-FOV activity component 1'. Further, in the approach of FIG. 3 each next outside-FOV estimate is larger in axial extent than the last the second outside-FOV activity distribution includes the components 1, 1' and the further components 2, 2', while the third outside-FOV activity distribution includes all illustrated components 1, 1', 2, 2', 3, 3'. Here, the scatter simulation can generate all sinogram candidates in a single run, by reusing the common scatter components from the inside-FOV. For example, in simulating the scatter distribution from the extended activity distribution including the activity in the FOV 14 and the extensions 1, 1', 2, 2', the previously computed scatter distribution from the regions 14, 1, 1' can be reused.

With further reference to FIG. 3, in another variation, the outside-FOV activity distribution estimate 40 is not limited to extension of activity outside the FOV 14 in the axial (z) direction. Illustrative FIG. 3 shows outside-FOV activity distribution extensions 1" and 1", 2" in the radial direction, i.e. transverse to the axial (z) direction.

With further reference to FIG. 3, in another variation, the outside-FOV activity distribution estimate 40 can be constructed from the different components of different activity intensities and attenuation densities. Each component 1, 1' can also be subdivided as seem necessary by the optimization algorithm.

The various operations 22, 24, 30, 42, 46, 48, 50, 52 described with reference to FIGS. 1 and 2 are suitably implemented as a microprocessor, microcontroller, PET imaging system controller and/or electronics, computer, or other electronic data processing device connected to receive the acquired PET imaging data 20 from the PET imaging system 10 (or, in the case of a PET imaging system controller, connected to control the PET imaging system 10 to acquire the PET imaging data 20) and programmed to perform the various operations 22, 24, 30, 42, 46, 48, 50, 52 or their equivalents. It will be further appreciated that the various operations 22, 24, 30, 42, 46, 48, 50, 52 described with reference to FIGS. 1 and 2 may be embodied by a non-transitory storage medium storing instructions that are readable and executable by such a microprocessor, microcontroller, PET imaging system controller and/or electronics, computer, or other electronic data processing device to perform these operations. Such non-transitory storage medium may, by way of non-limiting illustration, include a hard disk drive or other magnetic storage medium, a flash memory, read-only memory (ROM) or other electronic storage medium, an optical disk or other optical storage medium, various combinations thereof, or so forth.

It will also be appreciated that the disclosed outside-FOV scatter correction techniques may be usefully employed in other types of radioemission imaging besides PET, such as in single photon emission computed tomography (SPECT) in which the radioemission imaging data are acquired by a gamma camera with a honeycomb collimator or the like. Depending upon the particular radioemission imaging modality, there may be no convenient way or no need to perform the randoms correction (operations 22, 24 of FIG. 1). However, the disclosed outside-FOV scatter correction techniques can be performed without randoms correction, albeit with some reduction in reconstructed image accuracy.

With reference now to FIGS. 4-10, imaging experiments employing the disclosed outside-FOV scatter correction techniques are described.

Figure 4:
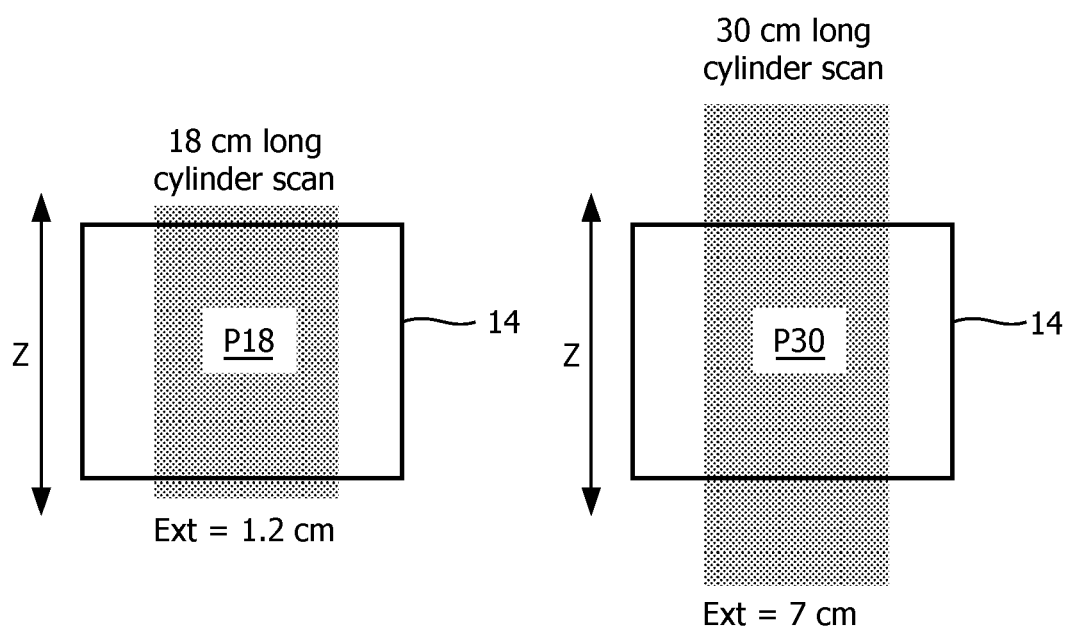
FIGS. 4-7 present experimental results as described herein.

As diagrammatically shown in FIG. 4, two cylindrical phantoms P18, P30 of length 18 cm and 30 cm, respectively, were imaged. The phantoms P18, P30 were each filled with uniform F-18 activity distribution, and oriented in the PET imaging scanner with their cylinder axis aligned with the axial (z) direction of the PET scanner. FIG. 4 indicates the FOV 14 and the axial (z) direction in each case. Single bed (single frame) data were acquired using a Vereos™ PET/CT camera (available from Koninklijke Philips N.V., Eindhoven, the Netherlands) with the phantoms P18, P30 positioned in the PET examination region centered with respect to the axial extent and in the transverse FOV. As the axial FOV of Vereos camera was equal to 16.4 cm, a certain part of the outside FOV activity was present during the imaging.

Figure 5:
Figure 6:
Figure 7:

FIGS. 5, 6, and 7 shows three sinograms: a random corrected sinogram (FIG. 5), a scatter sinogram assuming there is 10 cm of activity filling outside-FOV in both ends (FIG. 6), and, finally, the scatter sinogram generated, assuming that there is only 1 cm slab of outside-FOV activity in both ends (FIG. 7). A line L superimposed on each sinogram indicates an axial profile located outside the object boundary B in the random-corrected prompts sinograms. Therefore, data of line L only reflects the scatter distribution, as all true coincidences are generated inside the object (i.e. inside the phantom P18 or P30), and random coincidences have been already removed from the sinogram of FIG. 5. As already discussed, this "true scatter" distribution includes the scatter impact from both inside-FOV and outside-FOV. The simulated scatter sinogram that most closely matches the distribution outside the object (along profile line L, for example), should also very closely match the scatter distribution inside the object, as the scatter distribution is a slowly varying, smooth component.

Figure 8:
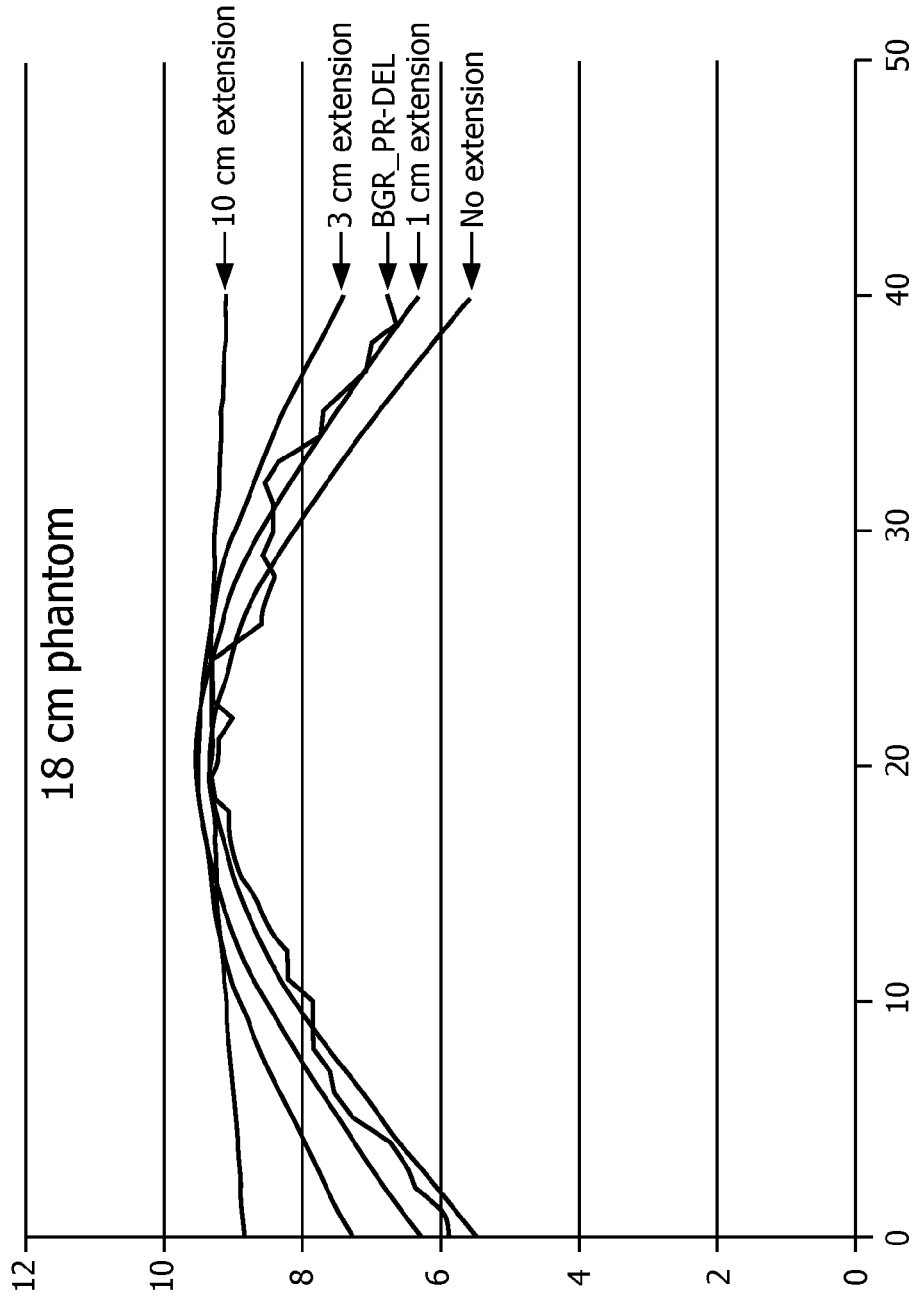
FIG. 8 shows scatter optimization for an 18 cm long phantom.

With reference to FIG. 8 and Table 1, first consider the case of the scan of the single bed 18 cm long phantom P18 (FIG. 4, left side) where only 1.2 cm slab of outside-FOV activity is actually present. FIG. 8 shows the scatter optimization for the 18 cm long phantom P18, where 1 cm extension was optimal for this case. The profiles of FIG. 8 exhibit a slight asymmetry, which may be due to the phantom P18 being slightly off-centered (to the right) with respect to the axial extent of the FOV 14. In FIG. 8, the label "BGR_PR-DEL" indicates an axially oriented profile line through the background of the random-corrected prompts sinogram (analogous to profile line L of FIGS. 5-7). The respective quantitative measures of deviation are listed below in Table 1. According to the plotted axial profiles in FIG. 8 and absolute errors summarized in Table 1 for phantom P18, the outside-FOV scatter correction technique disclosed herein indicated that an approximately 1 cm slab of outside-FOV activity is sufficient to account for the total scatter inside the FOV. It will be appreciated that further searching of the outside-FOV estimated activity could be performed by further simulating additional lengths around 1 cm (e.g. 0.98 cm, 1.02 cm, et cetera) to more precisely determine which length gives the best result however, typically, 1 cm is already good enough.

TABLE 1 summary of the absolute errors for different extensions for the 18 cm long uniform activity phantom (P18), where smaller error indicates optimal approximation of the outside-FOV activity

| Extension | 0 cm | 1 cm | 3 cm | 10 cm |
|---|---|---|---|---|
| SumAbsErrors | 14.6015 | 13.7983 | 27.3691 | 46.1274 |

Figure 9:
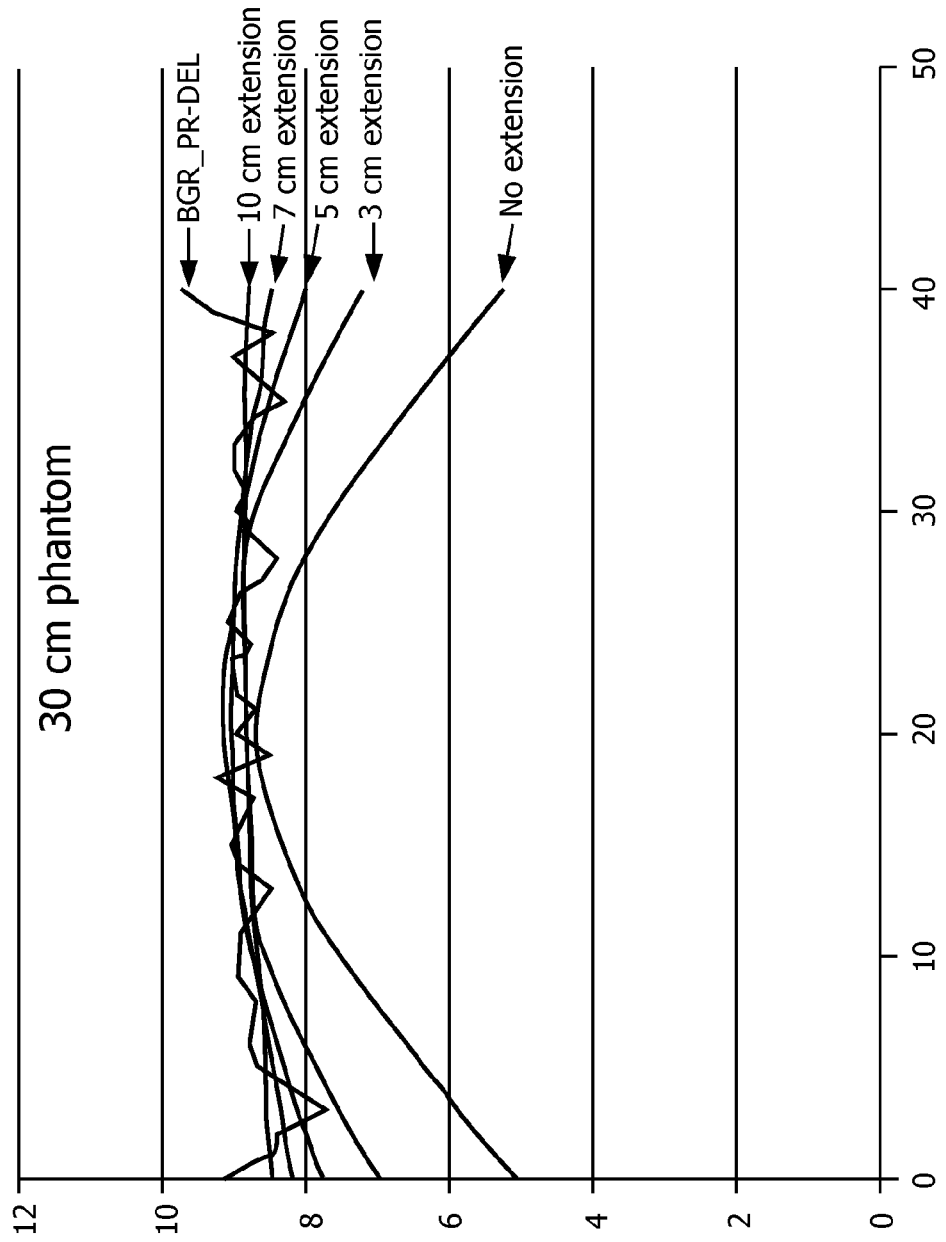
FIG. 9 shows scatter optimization for a 30 cm long phantom.

With reference to FIG. 9 and Table 2, the case of the single bed 30 cm long phantom P30 is considered, where 7 cm extension is actually present. In FIG. 9, the label "BGR_PR-DEL" indicates an axially oriented profile line through the background of the random-corrected prompts sinogram (analogous to profile line L of FIGS. 5-7). The respective quantitative measures of deviation are listed below in Table 2. In this case, the technique roughly indicated that a 7 to 10 cm precision extension is appropriate. This result is considered to be sufficient, as the further the outside-FOV activity is from the (axial) edge of the FOV 14, the less impact it has inside of the FOV 14.

TABLE 2 summary of the absolute errors for different extensions for the 30 cm long uniform activity phantom (P30), where smaller error indicates optimal approximation of the outside-FOV activity

| Extension, cm | 0 | 3 | 5 | 7 | 10 |
|---|---|---|---|---|---|
| SumAbsErrors | 61.5 | 22.7 | 13.5 | 10.8 | 10.2 |

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

The invention claimed is:

1. A radioemission imaging system comprising:
   a radioemission imaging data acquisition system configured to acquire radioemission imaging data in a field of view (FOV);
   an electronic data processing device programmed to reconstruct the radioemission imaging data by operations including:
   identifying a background portion of the radioemission imaging data corresponding to a background region of the FOV that is outside of an object disposed in the FOV;
   adjusting an outside-FOV activity estimate for at least one spatial region outside of the FOV to optimize a simulated scatter distribution for the combination of the radioemission imaging data and the outside-FOV activity estimate; and
   reconstructing a scatter-corrected image of the object in the FOV using the optimized simulated scatter distribution.

2. The radioemission imaging system of claim 1 wherein the adjusting comprises:
   iteratively adjusting the outside-FOV activity estimate to optimize a cost function comparing (i) the simulated scatter distribution for the combination of the radioemission imaging data and the outside-FOV activity estimate and (ii) the background portion of the radioemission imaging data.

3. The radioemission imaging system of claim 1 wherein the adjusting comprises:
   for each of a plurality of different outside-FOV activity estimates, computing a cost function comparing (i) the simulated scatter distribution for the combination of the radioemission imaging data and the outside-FOV activity estimate and (ii) the scatter background portion of the radioemission imaging data; and
   selecting the outside-FOV activity estimate that optimizes the cost function to improve the simulated scatter distribution for the combination of the radioemission imaging data and the outside-FOV activity estimate.

4. The radioemission imaging system of claim 1 wherein the radioemission imaging data acquisition system comprises a positron emission tomography (PET) imaging system configured to acquire PET imaging data in the FOV.

5. The radioemission imaging system of claim 4 wherein the electronic data processing device is programmed to reconstruct the radioemission imaging data by operations further including:
performing randoms correction on the PET imaging data to produce randoms-corrected PET imaging data wherein the identifying, the adjusting, and the reconstructing operate on the randoms-corrected PET imaging data.

6. The radioemission imaging system of claim 4 wherein the electronic data processing device is programmed to reconstruct the PET imaging data by said operations performed on the PET imaging data represented as a sinogram.

7. The radioemission imaging system of claim 6 wherein the identifying includes:
identifying a boundary of the object in the sinogram as a decrease in sinogram intensity; and
identifying the background portion as the portion of the sinogram on the lower intensity side of the boundary.

8. The radioemission imaging system of claim 1 wherein the outside-FOV activity estimate includes two outside-FOV activity estimate components on opposite sides of the FOV.

9. The radioemission imaging system of claim 8 wherein the two outside-FOV activity estimate components on opposite sides of the FOV are asymmetric respective to the FOV.

10. The radioemission imaging system of claim 8 wherein the outside-FOV activity estimate further includes a third outside-FOV activity estimate component on a third side of the FOV.

11. The radioemission imaging system of claim 1 wherein the outside-FOV activity estimate is adjacent a side of the FOV and the adjusting includes extending the outside-FOV activity estimate successively further out from the side of the FOV wherein a later repetition of the extending re-uses the simulated scatter distribution simulated for an earlier repetition of the extending.

12. The radioemission imaging system of claim 1 wherein the outside-FOV activity estimate includes an attenuation estimate.

13. A method of generating a scatter-corrected image from positron emission tomography imaging data acquired of an object in a field of view (FOV), the method comprising:
identifying a background portion of the PET imaging data corresponding to a background region of the FOV that is outside of the object;
adjusting an outside-FOV activity estimate for at least one spatial region outside of the FOV and into which the object extends to optimize a simulated scatter distribution for the combination of the PET imaging data and the outside-FOV activity estimate to match the background portion of the PET imaging data; and
reconstructing the PET imaging data to generate a scatter-corrected PET image of the object in the FOV using the optimized simulated scatter distribution.

14. The method of claim 13 further comprising:
performing randoms correction on the PET imaging data to produce randoms-corrected PET imaging data wherein the identifying, adjusting, and reconstructing are performed on the randoms-corrected PET imaging data.

15. The method of claim 13 wherein the PET imaging data are represented as a sinogram.

16. The method of claim 15 wherein the identifying includes:
identifying a boundary of the object in the sinogram as a decrease in sinogram intensity; and
identifying the background portion in the sinogram as lying on the lower intensity side of the boundary of the object in the sinogram.

17. The method of claim 13 wherein the outside-FOV activity estimate includes two outside-FOV activity estimate components on opposite sides of the FOV.

18. The method of claim 17 wherein the two outside-FOV activity estimate components on opposite sides of the FOV are asymmetric respective to the FOV.

19. The method of claim 17 wherein the outside-FOV activity estimate further includes a third outside-FOV activity estimate component on a third side of the FOV.

20. The method of claim 13 wherein the outside-FOV activity estimate is adjacent a side of the FOV and the adjusting includes extending the outside-FOV activity estimate successively further out from the side of the FOV wherein a later repetition of the extending re-uses the simulated scatter distribution simulated for an earlier repetition of the extending.

21. A non-transitory storage medium storing instructions readable and executable by an electronic data processing device to perform a method for estimating a scatter distribution in positron emission tomography (PET) imaging data acquired of an object in a field of view (FOV), the method comprising:
identifying a background portion of the PET imaging data comprising lines of response (LORs) that do not pass through the object;
adjusting an outside-FOV activity estimate for at least one spatial region outside of the FOV and into which the object extends to optimize a simulated scatter distribution for the combination of the PET imaging data and the outside-FOV activity estimate respective to the background portion of the PET imaging data; and
estimating the scatter distribution in the PET imaging data as the optimized simulated scatter distribution output by the adjusting.

22. The non-transitory storage medium of claim 21 further storing instructions readable and executable by the electronic data processing device to reconstruct the PET imaging data to generate a scatter-corrected PET image of the object in the FOV using the estimated scatter distribution.

23. The non-transitory storage medium of claim 21 wherein the outside-FOV activity estimate includes first and second outside-FOV activity estimate components on opposite sides of the FOV.

24. The non-transitory storage medium of claim 21 wherein the adjusting comprises one of:
(1) iteratively adjusting the outside-FOV activity estimate to optimize a cost function comparing (i) the simulated scatter distribution for the combination of the radioemission imaging data and the outside-FOV activity estimate and (ii) the background portion of the PET imaging data; and
(2) for each of a plurality of different outside-FOV activity estimates, computing a cost function comparing (i) the simulated scatter distribution for the combination of the radioemission imaging data and the outside-FOV activity estimate and (ii) the background portion of the PET imaging data, and selecting the outside-FOV activity estimate to optimize the simulated scatter distribution for the combination of the radioemission imaging data and the outside-FOV activity estimate.

25. The non-transitory storage medium of claim 21 wherein the outside-FOV activity estimate includes an attenuation estimate.

\* \* \* \* \*